US009572184B1

(12) United States Patent
Erdogan

(10) Patent No.: US 9,572,184 B1
(45) Date of Patent: Feb. 14, 2017

(54) PORTABLE DEVICES PAIRED TO SHARE WIRELESS CONNECTIVITY

(71) Applicant: Lucan Patent Holdco, LLC, Loveland, CO (US)

(72) Inventor: Murat Erdogan, Evans, CO (US)

(73) Assignee: Lucan Patent Holdco, LLC, Loveland, CO (US)

( * ) Notice: Subject to any disclaimer, the term of this patent is extended or adjusted under 35 U.S.C. 154(b) by 0 days.

(21) Appl. No.: 14/953,734

(22) Filed: Nov. 30, 2015

(51) Int. Cl.
*H04B 7/00* (2006.01)
*H04W 76/02* (2009.01)
*H04W 4/00* (2009.01)
*H04W 12/06* (2009.01)
*H04W 4/22* (2009.01)

(52) U.S. Cl.
CPC ............ *H04W 76/02* (2013.01); *H04W 4/008* (2013.01); *H04W 4/22* (2013.01); *H04W 12/06* (2013.01)

(58) Field of Classification Search
None
See application file for complete search history.

(56) References Cited

U.S. PATENT DOCUMENTS

| 6,775,546 | B1 | 8/2004 | Fuller |
| 7,003,287 | B2 | 2/2006 | Roeder |
| 7,412,257 | B2 | 8/2008 | Loveland |
| 7,426,265 | B2 | 9/2008 | Chen et al. |
| 2006/0217112 | A1 | 9/2006 | Mo |
| 2010/0137015 | A1* | 6/2010 | Blanco ................ H04W 4/10 455/518 |
| 2015/0065186 | A1* | 3/2015 | Mohd Mohdi ......... H04W 4/10 455/518 |
| 2015/0245184 | A1 | 8/2015 | Govande |

FOREIGN PATENT DOCUMENTS

| IL | WO 03081877 A2 * | 10/2003 | ............ H04Q 3/005 |
| WO | 03081877 A2 | 10/2003 | |

* cited by examiner

*Primary Examiner* — Mohammed Rachedine
(74) *Attorney, Agent, or Firm* — Russell Krajec; BlueIron, LLC

(57) ABSTRACT

A set of portable devices may be paired together to share a combined set of connectivity options. Each of the portable devices may have one or more connections to external networks, and may be paired to each other such that one device may use the external connection of another device. The pairing system may evaluate connectivity strength, battery power, and other factors for routing connections between devices to external networks. Incoming connections, such as cellular telephone calls, may be selectively routed to one of the various devices in certain circumstances and a different device in other circumstances. An incoming phone call may be answered and responded to by any of the connected devices, even though the connection may have been originally received by a different device.

28 Claims, 11 Drawing Sheets

US 9,572,184 B1

PORTABLE DEVICES PAIRED TO SHARE WIRELESS CONNECTIVITY

BACKGROUND

A wide range of portable devices have become commonplace. These devices may include cellular telephones, fitness tracking devices, smart watches, emergency response devices, and other devices. Typically, a cellular telephone may act as the common gateway for various ancillary devices, such as fitness trackers, emergency alert devices, or smart watches. As such, the ancillary devices may first communicate with the cellular telephone, then the cellular telephone may connect with another network, such as a cellular network or other wireless network.

SUMMARY

A set of portable devices may be paired together to share a combined set of connectivity options. Each of the portable devices may have one or more connections to external networks, and may be paired to each other such that one device may use the external connection of another device. The pairing system may evaluate connectivity strength, battery power, and other factors for routing connections between devices to external networks. Incoming connections, such as cellular telephone calls, may be selectively routed to one of the various devices in certain circumstances and a different device in other circumstances. An incoming phone call may be answered and responded to by any of the connected devices, even though the connection may have been originally received by a different device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
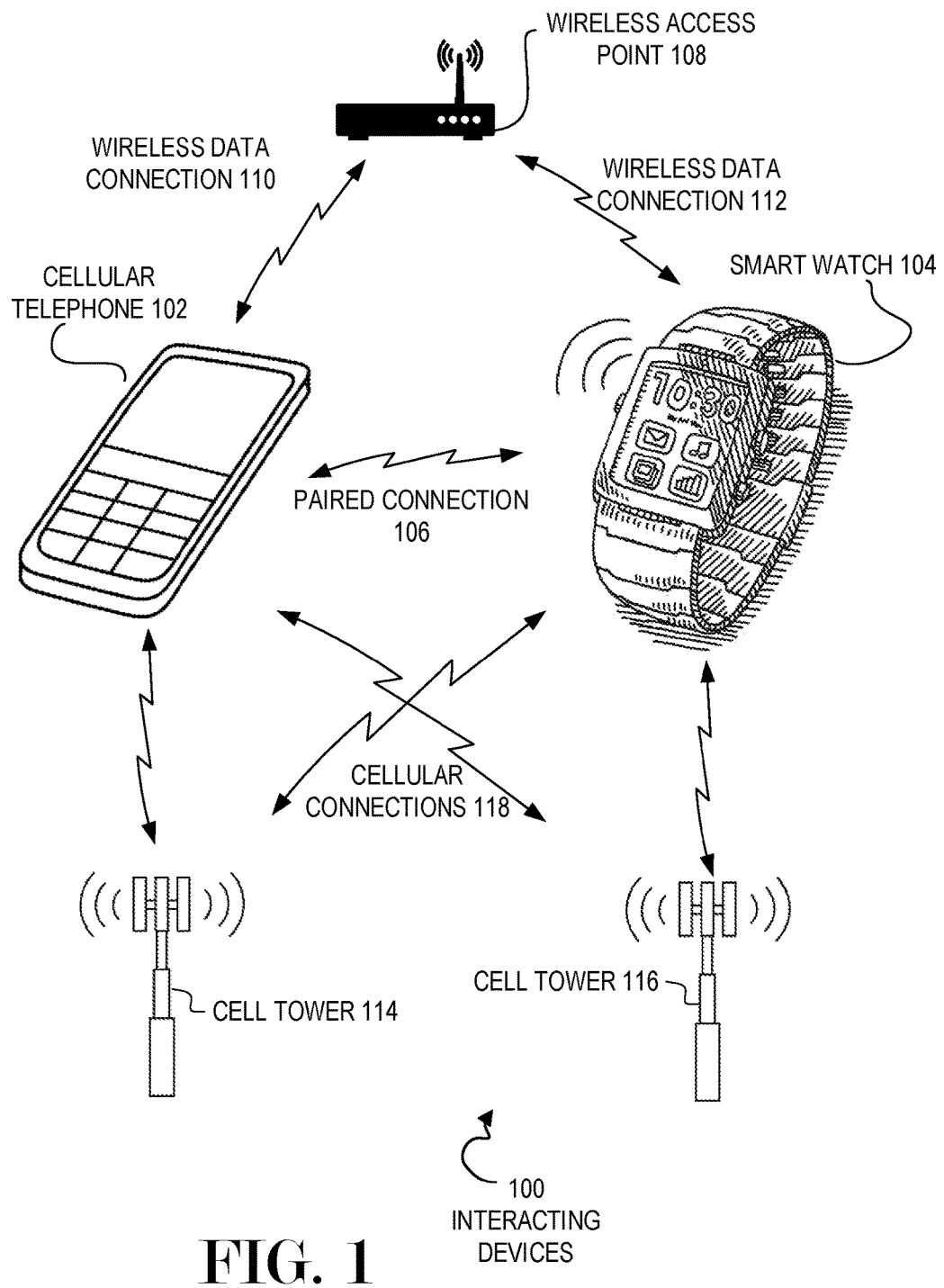
FIG. 1 is a diagram illustration of an embodiment showing interacting devices.

A set of devices may be paired together to share external network connections. Each of the devices may have connections to wireless networks, which may include cellular telephone networks, wireless data networks, or other networks. The devices may be paired together to share network connectivity, such that any paired device may access the network connections of another device. The pairing may use a second wireless connection that may be a peer-to-peer connection, such as Bluetooth or other wireless connection.

The devices may be, for example, a cellular telephone, smart watch, fitness tracker, emergency alert device, or other device. Each of the devices may have external network connections plus a secondary connection. The secondary connection may be a paired connection where two devices may be authenticated to each other and may share resources such as external network connections.

In one example, a cellular telephone may be paired with a smart watch. Both the cellular telephone and the smart watch may each have a cellular radio, local area wireless connection, or other external network connection. The two devices may be paired together to share the external connections of the superset of devices.

A set of logic may be applied to determine how and when resources may be shared. In the example above, a telephone call may be received by one or both devices, yet may be answered by either of the two devices because the receiving device may send an alert to the other device, and the other device may display an incoming call notification. The user may answer the call from either device, and the speakers and microphone of the answering device may be used to listen and talk during the call. The paired connection may route the communications from the device that received the call to the device that answers the call.

The set of logic may determine that one device may be preferred for making an external connection. In the example above, the cellular telephone may have a larger battery than the smart watch and thus may be the primary device for receiving an incoming phone call or establishing an outbound phone call. When the smart watch in the example has more available battery power than the cellular telephone, the smart watch may be used. Such an example uses battery power as a criteria for routing communications between devices, but other criteria may include signal strength, connection costs, or other criteria.

A set of logic may be applied to navigating connections that may originate on an external network. For example, a cellular telephone call may originate from a caller, and the connection may be directed to one or more of the paired devices. The connection may be routed using logic within an intermediate router device or logic within a cellular provider's network. In some cases, the call may be received by two paired devices, and between the two paired devices, one of the paired devices may drop the call and the other device may forward information about the call to the first device. In such cases, the logic may be a negotiation between the two paired receiving devices to determine which device may handle the connection. The negotiation may be performed before or after an incoming connection is received.

The mechanisms for determine resource sharing logic may be deployed in several locations. In some cases, the resource sharing logic may be deployed on a primary controller device which may be paired with other secondary devices. The primary controller device may have a paired connection with a secondary device that may allow the primary controller device to control some of the resources of a secondary device.

In one example of such a system, a smart watch may be a primary controller and may be paired with a cellular telephone. The smart watch may determine which device, either the smart watch or the cellular phone, may receive or transmit a specific connection. The smart watch may send control signals to the cellular telephone to initiate or end a connection, as well as to answer or drop an incoming call. In a typical use case, an incoming call may be received by both the smart watch and the cellular telephone, and the smart watch may determine which device's signal strength may be superior, which device may have adequate battery life, or some other criteria, then may cause the incoming call to be dropped by one of the devices so that when the user answers the call, the call will be received by the device selected by the smart watch.

Resource sharing logic may be deployed within a cellular network by determining which of the paired devices may be a preferred connection. The preferred connection may change over time, such as when the signal strength of the devices may change or battery charge may change, for example. The cellular network may have an intermediary router that may keep track of the presence and performance of the various paired devices, and may route a call to the device with the preferred connection and not route a call to its paired companion.

One example may include a cellular telephone and a personal fitness monitoring device, personal emergency alerting device, or other wearable technology device that may have a connection to a cellular telephone as well as a connection to a remote network. In some cases, such wearable technology device may have its own cellular radio, local wireless data network radio, or other wireless connection. A connection manager may allow sharing of a cellular telephone's resources as a primary mode of operation, but may re-route the wearable device's communication through the wearable device's wireless connections when the cellular telephone's connections may not be available or when the connection to the cellular telephone may not be available.

Some wearable technology devices, such as emergency alert devices, may have a high importance for sending a communication. An emergency alert device may be a device carried by a person and may be linked to the person's cellular telephone using an authenticated or paired connection. The device may trigger a message to be sent in case of an event. Many such devices may have a button, for example, that a user may depress when the user may be in distress. An example may be an elderly person who may live alone or a young woman who may be walking through a city at night. In either case, the person may signal the emergency alert device and a message may be sent. The message may be configured to be sent to a friend, caregiver, or emergency personnel such as police or medical personnel.

Emergency alert devices may be configured with multiple wireless connections. When activated, the emergency alert device may transmit an alert through a paired device, such as a cellular telephone, as a default configuration.

Such a configuration may be a primary or default configuration because a cellular telephone may have stronger battery life or more sophisticated capabilities. One such capability may be to gather positioning information, such as Global Positioning System (GPS) data, signatures or identifications of wireless connections available in the area, motion tracking data, audio or video input, or other data. Such data may be attached to a message and uploaded via a cellular connection or local area wireless data connection.

Continuing with the example of an emergency alert operation, when a paired connection to a cellular telephone may not be available, an emergency alert device may transmit a message using a radio and wireless connection built into the device. Such connections may include cellular, local area wireless, or other wireless connections. In some cases, messages may be passed through multiple connections nearly simultaneously. For example, the emergency alert device may transmit over its integral cellular or other wireless connection to a remote service, and at the same time may transmit through a paired connection to a cellular telephone. When routed through the cellular telephone, an application on the cellular telephone may collect additional data and append the data to an outgoing message. The messages transmitted from the emergency alert device and the cellular telephone may both be transmitted to a remote service and aggregated into a message that may be transmitted to a recipient.

In many cases, a device such as a smart watch, fitness monitoring device, or other medical or biological monitoring device may have the capability of operating as an emergency alert device. Such devices may be actuated to send a signal based on a user input, such as described above where a user may press a button, as well as monitored inputs from various sensors. For example, accelerometers or other motion sensing devices may detect that a user may have fallen. Such an input may cause an emergency monitoring function to trigger a message. In many cases, an audio input may receive a user's voice and create a message from the user. For example, a user may say "I've fallen and I can't get up". Such a message may be captured and transmitted as part of the outgoing message.

Many devices such as a smart watch, fitness tracker, or other medical wearable device may have biometric sensors that may monitor a user's blood pressure, heart rate, temperature, blood sugar level, blood oxygen content, or other biometric parameter. In some cases, a monitoring application may determine that a user's health may be in jeopardy and may issue an outgoing communication.

The cases described above have multiple devices that may connect to an external network. Additional use cases may include home automation systems, industrial automation systems, and many more systems where multiple devices may have access to outside networks. A primary device may be designated for communications, then inbound and outbound communications may be routed through those devices. If the primary device encounters a failure, has connection problems, or has other conditions, another device may be designated as a primary device and communications may be rerouted through the newly designated primary device.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100 showing paired devices and their various connections. Embodiment 100 is merely one example of a set of devices that may interact to share network connection resources, and may negotiate the use of those resources in various scenarios.

A cellular telephone 102 may be connected with a smart watch 104 using a paired connection 106. The example of a cellular telephone 102 and smart watch 104 may be one example of devices that may operate together. In many cases, such devices may be operated together, such that applications on the smart watch 104 may interact with applications on the cellular telephone 102 and vice versa. For example, a telephone call may be configured such that a microphone and speaker on the smart watch 104 may be used to interact with a telephone call that may be processed by the cellular phone 102. In another example, applications operating on the cellular phone 102 may send alerts or messages to the smart watch 104.

The paired connection 106 may be any type of authenticated connection. Bluetooth and other protocols may provide for authentication between devices such that trusted communications may occur. Many such protocols may have various mechanisms for establishing a pairing or authenticated relationship, and such authentication may occur automatically when the devices may be brought into range of each other.

The paired connection 106 may be used to periodically update status between the devices, as well as to route communications from one device through another to an external network. One or both of the devices may have a process that may detect the presence or absence of the other device, as well as to transmit and/or receive status information about the other device. The status information may include device performance metrics, such as amount of available battery, connection speeds, bandwidth, packet loss, resource availability, and other metrics. The status information may be used to determine when to route communications through the other device.

Routing communications through the paired connection 106 may be useful to share resources between the devices. In a cellular telephone 102 and smart watch 104 configuration, the cellular telephone 102 may have more available battery life than the smart watch 104 due to its form factor, but the smart watch 104 may have a user interface that a user may prefer for some functions.

For example, a user may prefer to answer a phone call through the smart watch 104. Since both devices may have a cellular connection 118, the phone call may be capable of being received and answered through either device. However, when the cellular telephone 102 may be designated as a primary device, the call may be routed through the cellular telephone 102 while the user interacts with the phone call using a speaker and microphone located on the smart watch 104. In such an example, the cellular telephone 102 may be designated as a primary device when the cellular telephone 102 may have a better connection, more battery availability, or other advantage over using a connection through the smart watch 104.

In another example, a user may prefer to check their upcoming appointments through the smart watch 104 display. In such an example, a calendar application may operate on the smart watch 104 and may access a remote calendar system. Often, the cellular telephone 102 may also have a calendar application and may also access the remote calendar system. The data connection between the smart watch 104 and the remote calendar system may be routed through the cellular telephone 102 when the wireless data connection 110 may be the primary connection and the wireless data connection 112 may be a secondary connection.

In still another example, the smart watch 104 may be configured to access calendar information from a calendar application on the cellular telephone 102 across the paired connection 106. Such a configuration may be a default configuration, but when the paired connection 106 may be disconnected or may have low bandwidth or poor signal, the connection may be routed over a wireless data connection 112 or through a cellular connection 118 to a remote calendar server.

The cellular telephone 102 and smart watch 104 may be worn together. The smart watch 104 may be worn on a wrist, while the cellular telephone 102 may be carried on a user's person, placed in a briefcase, purse, or other luggage. The proximity of the two devices may enable scenarios where the devices may share resources.

A wireless access point 108 may be one mechanism for connecting the various devices to outside or external networks. The cellular telephone 102 may have a wireless data connection 110 while the smart watch 104 may have a wireless data connection 112. The wireless data connections 110 and 112 may be a resource that may be shared between devices. For example, communications from one device may be routed through the paired connection 106 to the other device, and the other device may relay the communication to the wireless access point 108.

Similarly, the cellular telephone 102 and smart watch 104 may connect to cell towers 114 and 116 through various cellular connections 118. The smart watch 104 may be equipped with a radio for cellular communications, and may have a connection to the same or a different network than the cellular telephone 102.

In many cases, the cellular telephone 102 and smart watch 104 may each have radios capable of connecting to the same cellular network. In such cases, one of the devices may be a preferred or primary device for connecting to the same cellular network, and may receive an incoming call or connect an outgoing call, and may relay the connection for the other device, which may be considered a secondary device. In such a case, the secondary device may have its cellular connection turned off or on a lower power mode, while the primary device may communicate with the external network.

In some cases, the cellular telephone 102 and smart watch 104 may each have cellular connections but each may have connections to different cellular networks. In such cases, connections to an external network may be routed through either device. In some such cases, a negotiation may occur between the devices to determine a routing for a particular connection. The negotiation may include factors such as which device may have sufficient battery life to sustain a connection, signal strength, bandwidth, or other performance metric of the wireless connection, or even the cost of data transmission or other accounting factors. Based on the negotiation, one of the devices may become a primary device for communication and communications from the secondary device may be routed through the primary device.

The devices may communicate periodically to exchange status information any may change which device may be identified as primary or secondary for certain communication channels. For example, one of the devices may be designated as a primary device for cellular connections while the other device may be designated as a primary device for wireless data connections. Such a status may be updated and changed as the devices move geographically, as external interference may change connection performance, or as other factors cause each device's connections to change.

Figure 2:
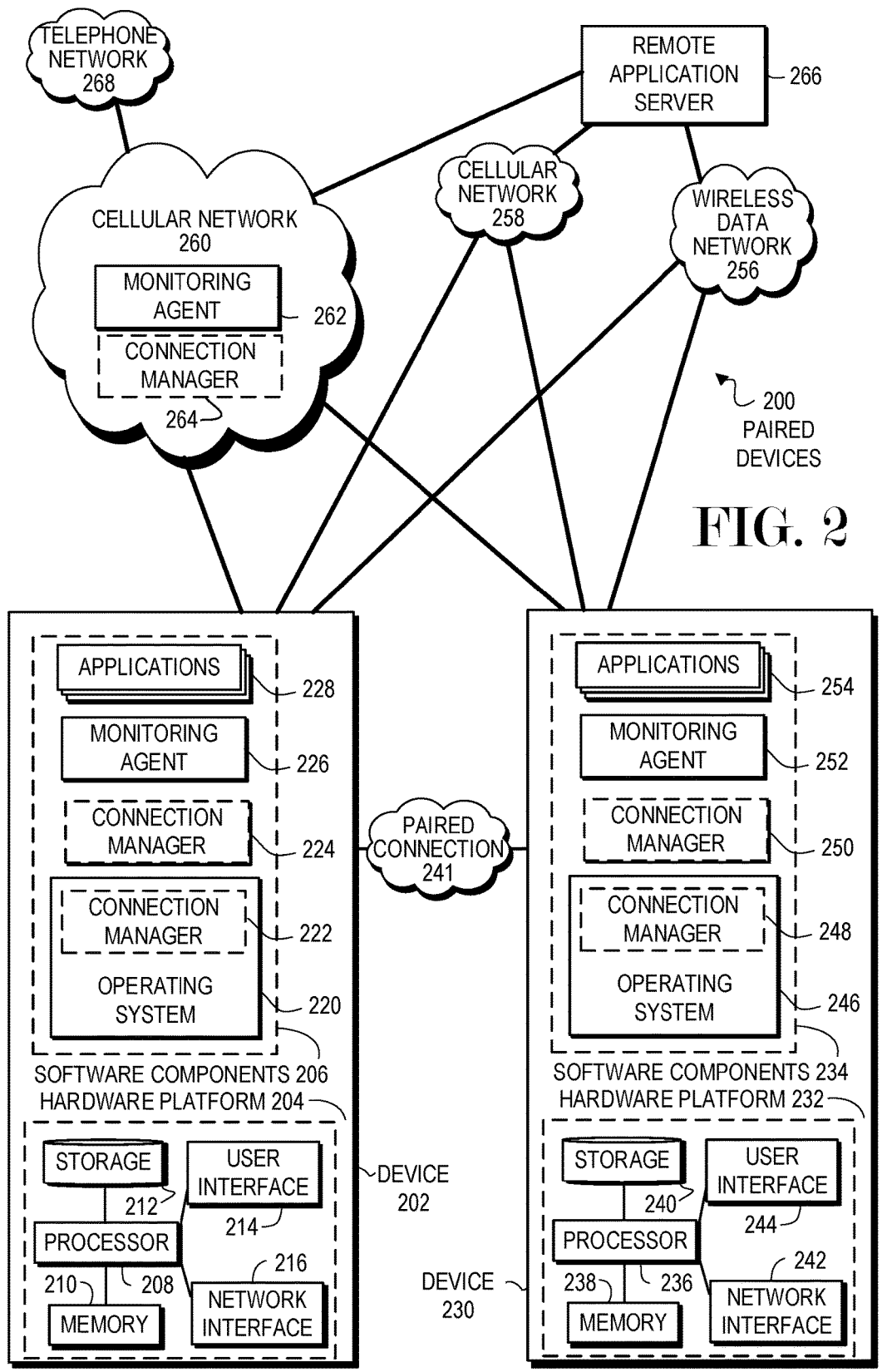
FIG. 2 is a diagram illustration of an embodiment showing paired devices.

FIG. 2 is a diagram of an embodiment 200 showing components that may create, post process, store, and analyze documents. Embodiment 200 is merely one example of components of a system that may be distributed on different hardware components and platforms. In other embodiments, the various components may be implemented differently.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates two devices that may have a hardware platform 204 and various software components. Both devices 202 and 230 as illustrated represent conventional computing device, although other embodiments may have different configurations, architectures, or components. The devices 202 and 230 may be, for example, cellular telephones, smart watches, or other devices that may have similar components and functions.

The hardware platforms 204 and 232 may include a processor 208 or 236, random access memory 210 or 238, and nonvolatile storage 212 or 240. The hardware platforms 204 and 232 may also include user interfaces 214 or 242 and network interfaces 216 or 244.

The random access memory 210 or 238 may be storage that contains data objects and executable code that can be quickly accessed by the processors 208 or 236. In many embodiments, the random access memory 210 or 238 may have a high-speed bus connecting the memory 210 or 238 to the processors 208 or 236.

The nonvolatile storage 212 or 240 may be storage that persists after the device 202 or 230 is shut down. The nonvolatile storage 212 or 240 may be any type of storage device, including hard disk, solid state memory devices, magnetic tape, optical storage, or other type of storage. The nonvolatile storage 212 or 240 may be read only or read/write capable. In some embodiments, the nonvolatile storage 212 or 240 may be cloud based, network storage, or other storage that may be accessed over a network connection.

The user interfaces 214 or 244 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, touchscreen, or other pointing device. Other input devices may include various sensors, including biometric input devices, audio and video input devices, and other sensors.

The network interfaces 216 or 242 may be any type of connection to another computer or external network. In many embodiments, the network interface 216 or 242 may be a wireless connection to a cellular telephone network, a local area data network, or some other wireless connection. In some cases, a wired connection may be made between the device 202 and 230, or between either of the devices 202 and 230 and other devices. Other embodiments may include wired or wireless connections over various communication protocols.

The software components 206 or 234 may include an operating system 218 or 246 on which various software components and services may operate.

The operating systems 218 or 246 may include a connection manager 222 or 248. The connection managers 222 or 248 may be a function, application, component, or other feature that may manage the connections between the devices 202 and 230, including the connections to outside or external networks. In some cases, the connection managers 222 or 248 may be components within an operating system, but in other cases, the connection managers 224 and 250 may be applications or functions that may be separate from the operating system 220 or 246.

A connection manager may determine a current status of the device on which it operates and may transmit the status to another device. In many cases, a connection manager may also receive the status of other devices. The status may include a device's connection status, such as bandwidth, signal strength, uptime, cumulative throughput, or other metrics of connection status. The status may also include various metrics of the device's operational performance, such as CPU load, battery life, battery strength, power status such as charging, and other metrics.

A connection manager may determine how to route connections between the various devices. In some cases, a connection manager may operate on each device and may cooperatively determine routings. Such a case may be a peer-to-peer arrangement. In other cases, a single device may have a connection manager and that connection manager may determine appropriate routing and cause the other devices to be configured to route communications in that manner. Such a case may be a master-slave arrangement.

A monitoring agent 226 or 252 may monitor various functions any may send communication to connection managers on other devices. A monitoring agent 226 or 252 may operate by sending updates as changes may occur in the network or devices. In such cases, the monitoring agent 226 or 252 may not send updates unless a change may have been detected. In some cases, monitoring agents may send updates at regular intervals regardless of a change in status.

Various applications 228 and 254 may operate on the devices 202 and 230. The applications 228 and 254 may use communication channels to external networks. In some cases, certain applications may use cellular connections for data-related connections. Such applications may have the option to use wireless connections to local area wireless networks or other wireless connections that transmit primarily data.

A connection manager may route communications between external networks and the various applications 228 and 254. The monitoring agents 226 and 252 may help identify when changes occur to the various connections, then the connection managers may determine whether to re-route the communication through another route. Because both the devices 202 and 230 may have multiple connections to multiple external networks, a connection manager may be able to keep a connection alive by rerouting the connection when one or more links of a communication channel may be disrupted.

The devices 202 and 230 may be connected to various external networks, such as a wireless data network 256, a first cellular network 258, and a second cellular network 260. In many cases, the various networks may be used to connect to a remote application server 266. The remote application server 266 may be any computer or other network connected device that may interact with applications 228 or 254 operating on one of the devices 202 or 230.

The wireless data network 256 may be any type of wireless network, such as IEEE 802.11 ("WiFi"), IEEE 802.16 ("WiMAX"), IEEE 802.15.4 ("ZigBee"), "Z-Wave", IEEE 802.15.1 ("BlueTooth"), or any other type of wireless network. Some wireless data networks may be designed for high bandwidth, while other networks may be designed for low power applications, and still other networks may have other design objectives.

The devices 202 and 230 may be linked by a paired connection 241. The paired connection 241 may be an authenticated connection in many cases. The paired connection 241 may be configured so that resources may be shared across the connection. In many cases, applications operating on one device may share resources on another device.

For example, an application on one device may transmit information to the other device for display. The receiving device may capture input, such as a touchscreen input, audio input, video input, keyboard input, or other input, and may pass the input back to the application running on the originating device. One such example may be a calendar application which may operate on a cellular telephone. Such an application may operate with a calendar application on a smart watch, where the smart watch calendar application may receive input from the cellular telephone application and present the input on the smart watch's display. Such information may be an alert, for example, of an upcoming appointment. The user may respond by tapping the smart watch, and the user's input may be transmitted to the application on the cellular phone. In this example, the communications may be transmitted across the paired connection.

In the example, if the paired connection 241 may be severed or be disconnected, an application may establish communications with a remote application server 266 or some other data source. A monitoring agent and connection manager may identify the disconnection and may signal the application to change routing. In such situations, the application may have an input signal that may cause the application to reconfigure its communication. In other cases, the routing of a communication session may be changed without alerting the application. In such cases, a connection manager may reroute a communication session to another device or through another device without alerting or making changes to the application.

A connection manager 264 and monitoring agent 262 may reside within a cellular network 260 or may be in an intermediate position between a cellular network 260 and the various devices 202 and 230. In this position, a connection manager 264 and monitoring agent 262 may route inbound calls from a telephone network 268 to the devices 202 and 230.

The connection manager 264 and monitoring agent 262 may detect which of the devices 202 and 230 may be a preferred or primary device for incoming phone calls. The preferred or primary device may be the device with better signal strength, battery life, or other parameter. Based on the current primary device, the connection manager 264 may route an inbound call from the telephone network 268 to one of the devices 202 or 230. In such cases, a monitoring agent 262 may collect status information from the devices 202 and 230 from which a current primary device may be determined. Such a status may be updated periodically and may cause the primary device to be changed from one device to another when the statuses change.

By selecting one of the two devices 202 or 230 to receive an inbound call, only one of the two devices may expend battery energy to receive the call. In a typical use case, one of the devices 202 or 230 may receive an inbound call and may transmit a message across the paired connection 241 to the other device so that both devices may display the incoming call to a user. When the user selects one of the devices to answer the call, the other device may detect that the call has been answered.

A connection manager 224, 250, or 264 may periodically reassess a primary or preferred routing for different types of communications. In many cases, a connection manager may have an algorithm or logic that may determine the primary routing. Such an algorithm may take into account various status parameters, as well as whether or not the devices 202 and 230 may be in proximity to each other or have a paired connection 241 established and active. When the devices 202 and 230 may not have an active paired connection 241 with each other, a connection manager 224, 250, or 264 may treat the devices as separate, unpaired devices.

When unpaired, the devices 202 and 230 may use the external network connections that each device has on its own and may not be able to route communication sessions through alternative devices. In many cases, a connection manager 224, 250, or 264 may turn off various connections on a secondary device because incoming communications may be routed through a paired connection to a primary device. By turning off the secondary connections, battery life in a secondary device may be conserved dramatically. In some cases, the secondary device may put its radios in a passive, standby, or low power mode in lieu of turning off the radio completely.

When a connection manager 224, 250, or 264 may detect that the paired connection is faulty or no longer exists, a connection manager 224, 250, or 264 may cause the secondary device to turn on the otherwise dormant connection. In some cases, such a signal to turn on a dormant connection may originate at a connection manager within the device, or may be received through another connection.

Figure 3:
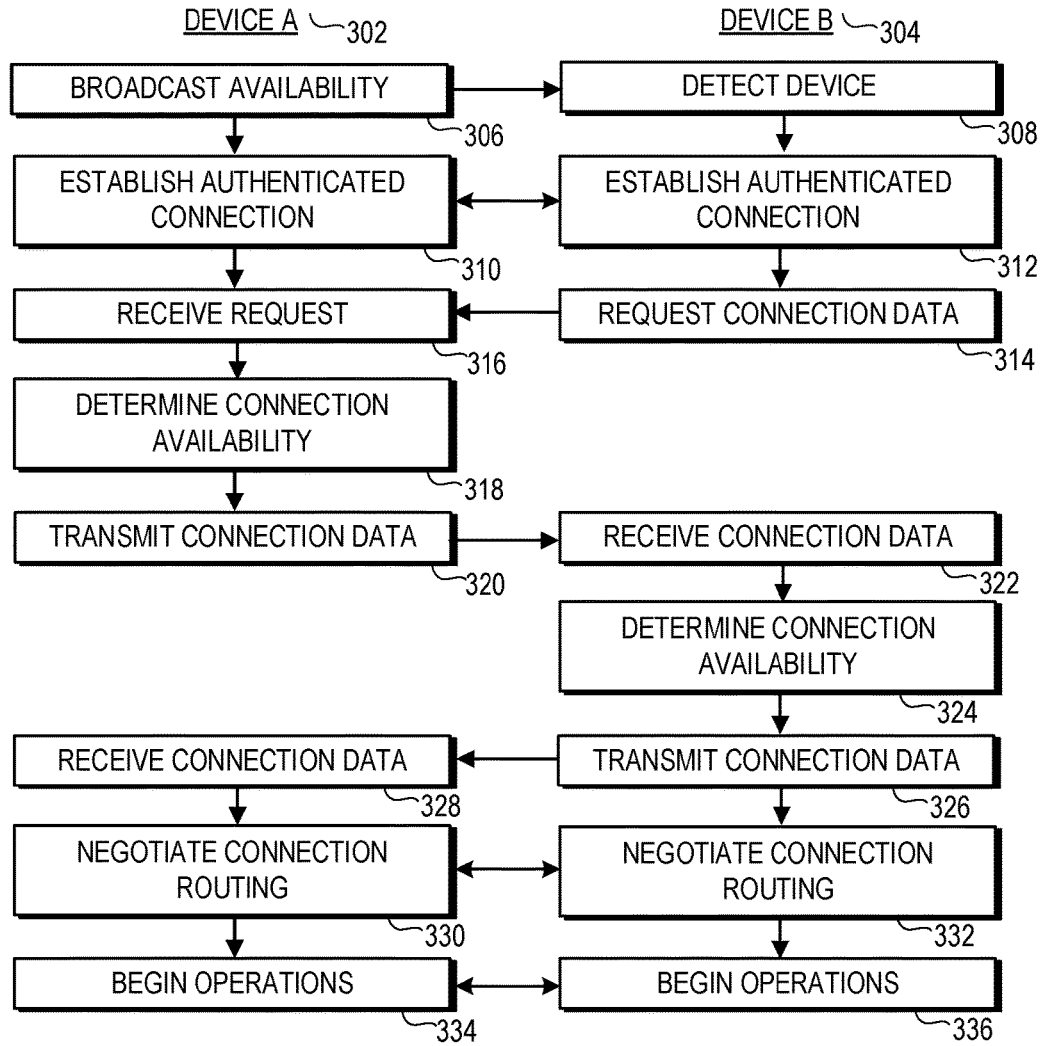
FIG. 3 is a flowchart illustration of an embodiment showing a method for initializing paired devices.

FIG. 3 is a flowchart illustration of an embodiment 300 showing a simplified example method for establishing connections between devices. The operations of a device A 302 may be shown in a left hand column, and operations of a device B 304 may be shown in a right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is a simplified example of a method whereby two devices may connect and share external network connections. In many cases, an initial pairing or authenticated connection may be established the first time devices may be connected, and such a connection may be reestablished on subsequent occasions when the devices may be brought together. The initial authentication may involve manual verification of the identity of the other device, and subsequent connections may not use such manual verification.

Device A 302 may begin by broadcasting its availability to connect in block 306. Device B 304 may detect device A in block 308. In blocks 310 and 312, an authenticated connection may be established.

After an authenticated connection may be established, device B 304 may request connection data in block 314. The request may be received in block 316 by device A 302, and connection availability may be determined in block 318. The connection data may be transmitted in block 320 and received by device B 304 in block 322.

Similarly, device B 304 may determine connection availability in block 324 and may transmit the data in block 326. Device A 302 may receive the data in block 328.

After exchanging connection data, the devices may negotiate connection routing in blocks 330 and 332. After connection routings are determined, operations with shared connection resources may begin in blocks 334 and 336.

The connection data exchanged between devices may include presence of connections as well as performance of those connections. Such information may include the presence of a cellular connection, a wireless data connection, a nearfield radio connection, or other external connections. In some cases, such information may include wired connections as well. For each of the available connections, various performance metrics may also be collected. The performance metrics may include speed or bandwidth, signal strength, latency, jitter, sustained and burst throughput, carrier data, identification of devices to which device A 302 and device B 304 are connected or could be connected, as well as any other metric.

The connection data may also include various status information about the devices, such as battery life, processor capabilities and status, network interface capabilities, available storage and memory, and other information. The data may also include available accessories such as positioning system or GPS receivers, cameras, microphones, motion sensors, accelerometers, biometric data, fingerprint readers, touchscreens, display devices, haptic actuators, or other accessories.

The negotiation between devices may determine which device, if any, may be given a role of primary device through which communications may be routed. Such a determination may be made by analyzing any or all of the data. The algorithm or mechanism for such a determination may vary based on the configuration and capabilities of the devices as well as various operational scenarios. For example, when one device may have much more battery power available, such a device may be chosen as a primary device in many cases. A device that may have superior signal strength, or may have a connection to a lower cost or otherwise preferred external network may be selected as a primary device.

In some cases, an application may influence which device may be a primary device. For example, an emergency alert application may operate on both a cellular telephone and a smart watch or a small personal emergency device. Such an application may operate on the cellular telephone to gather information about the user, such as a history of their location. Such a history may be, for example, the last 20 minutes of a user walking. When an emergency signal may be generated on another device, the cellular telephone may be triggered to generate a message with the history of the person's location and transmit the message. At the same time, the personal emergency device may transmit an outbound message using its radio connections.

Continuing with the example, when an emergency alert application may be present between a cellular telephone and a smart watch or personal emergency device pair, the primary device may be selected as the cellular telephone so that the emergency alert application may function optimally. When the paired connection may be severed, however, the smart watch or personal emergency device may operate separately and still transmit an outgoing emergency message.

Figure 4:
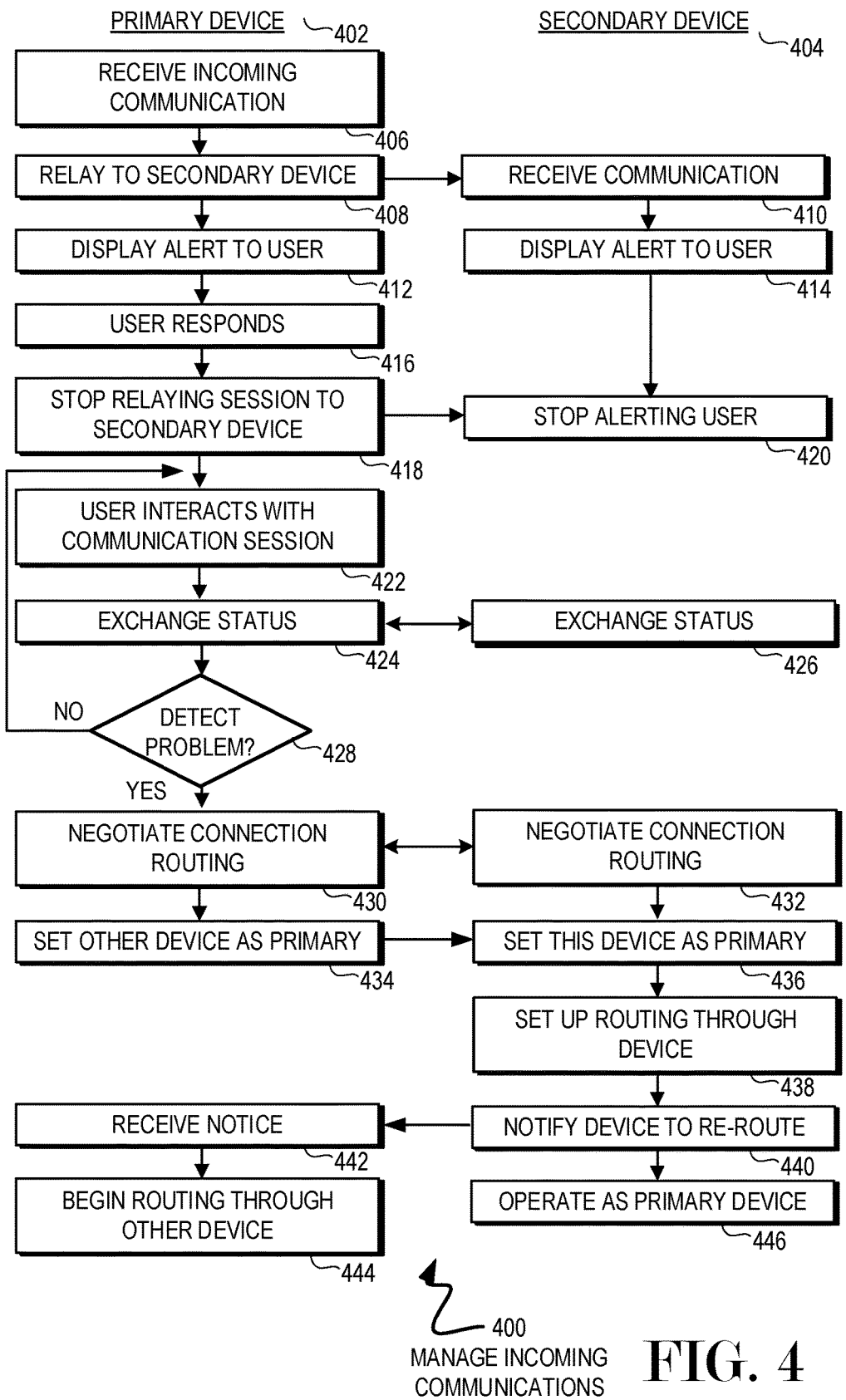
FIG. 4 is a flowchart illustration of an embodiment showing a method for managing incoming communications.

FIG. 4 is a flowchart illustration of an embodiment 400 showing a simplified example method for handling incoming communications, such as an incoming telephone call over a cellular connection. The operations of a primary device 402 may be shown in a left hand column, and operations of a secondary device 404 may be shown in a right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is merely one example of how an incoming communication, such as an inbound cellular telephone call, may be handled when two devices may be configured as a primary and a secondary device. In many cases, communications to a secondary device's radio may be redirected through a primary device's radio. In many cases, the secondary device's radio may be put in a low power state such that battery life may be extended for the secondary device.

When a device may be configured as a secondary device, communications to an external network may be routed across a paired connection to a primary device. The redirection may be implemented at several different levels within a device's software stack. In some cases, a device driver for a radio may have a rerouting feature that may direct communication across a paired connection to a primary device. In such cases, the rerouting may occur without changes to an application, and applications may continue to function as if the normal communication flow were in place.

On the primary device side, the rerouted communications may be passed across a paired connection and to the primary device's external network radio driver. In some cases, a monitoring agent may be capable of monitoring the communication pathway and a communication session may be established for the secondary device from the paired connection to the external network device driver.

In a different implementation, an interception layer or other mechanism may be placed between the radio driver and the application. In such an implementation, the interception layer may reroute the communication across a paired connection before the communication reaches the radio driver. As such, the interception layer may duplicate much of the communication protocol that the radio driver may provide, and may also give information to the application that its communications are being rerouted. On the primary device, the rerouted communication may be passed across the paired connection and a rerouting application may direct the communication to the external radio device driver.

A primary device 402 may receive an incoming communication in block 406 and may relay the information to the secondary device 404 in block 408. The secondary device 404 may receive the communication in block 410.

The user may elect to respond to the incoming communication on the primary device 402 in block 416. In block 418, the primary device 402 may stop relaying the communication session to the secondary device, and the secondary device 404 may stop alerting the user in block 420.

A typical scenario may be the reception of an incoming cellular telephone call where the devices may include a cellular telephone and a smart watch. Both devices may have cellular radios, but one of the devices may be designated as a primary device. In this example scenario, the cellular telephone may be designated as a primary device because it may have much more battery life than the companion smart watch. An inbound cellular call may be received by the cellular telephone and routed to the smart watch. Both devices may respond to the incoming call by alerting the user, which may be audio, visual, or haptic alerts. The user may select one of the devices to use to answer the call, and in this example it may be the cellular telephone. Once the call has been answered on the cellular telephone, the communication may be merely dropped or the smart watch may be alerted that the call has been answered on another device. In either way, the smart watch may stop presenting an alert to the user.

During normal operation, a user may interact with a communication session on the primary device 402 in block 422. Both the primary device 402 and secondary device 404 may exchange status information in blocks 424 and 426. If a problem not detected in block 428, the process may loop back to block 422. When a problem is detected in block 428, a resolution mechanism may be deployed.

In some cases, a secondary device may have a radio disabled, powered down, or may be in a low power state. In such a state, the secondary device may not be able to test its connectivity with an external network. In some embodiments, the secondary device may periodically bring the radio into a powered state and actually test the connection performance.

Some embodiments may have a secondary device test its performance metrics only when the status of a primary device may be declining. For example, the devices may exchange status in blocks 424 and 426, but the secondary device may have its external radio in a powered off mode. If the primary device 402 were to transmit a status where its external connection were declining, the secondary device 404 may detect the declining status of the primary device 402. Under such a circumstance, the secondary device 404 may power up its external radio, attempt to establish a connection, and may take performance measurements of its external radio. When the secondary device 404 may have superior performance over the primary radio in block 428, a negotiation process may begin in blocks 430 and 432.

During normal operation, both devices may periodically monitor their capabilities and performance. In many cases, the devices may change status. For example, a primary device may drain its battery while handling a call, or the devices may change locations such that one device may have a better connection. As such changes may occur in block 428, a negotiation may occur between the devices in blocks 430 and 432.

The negotiation in blocks 430 and 432 may involve determining which device may be better suited to act as a primary device for the current conditions. In the example of embodiment 400, a determination may be made in block 434 that the secondary device 404 may be better suited as the primary device. The secondary device 404 may be set as the primary device in block 436, and routing may be established through the device in block 438. When the routing has been configured, a notice may be made in block 440 to re-route the communication. The notice may be received in block 442 and the routing may begin through the other device in block 444. Normal operations may continue in block 446.

The example of embodiment 400 may illustrate a situation when the primary and secondary devices may exchange roles. Such embodiments may occur when the devices may be configured in a peer-to-peer relationship. In some embodiments, the devices may be configured in a master-slave relationship, where one device may be a primary device in that the control of the devices may reside at the primary device. In such embodiments, communications may be routed through the slave devices without designating the slave devices as primary devices.

Figure 5:
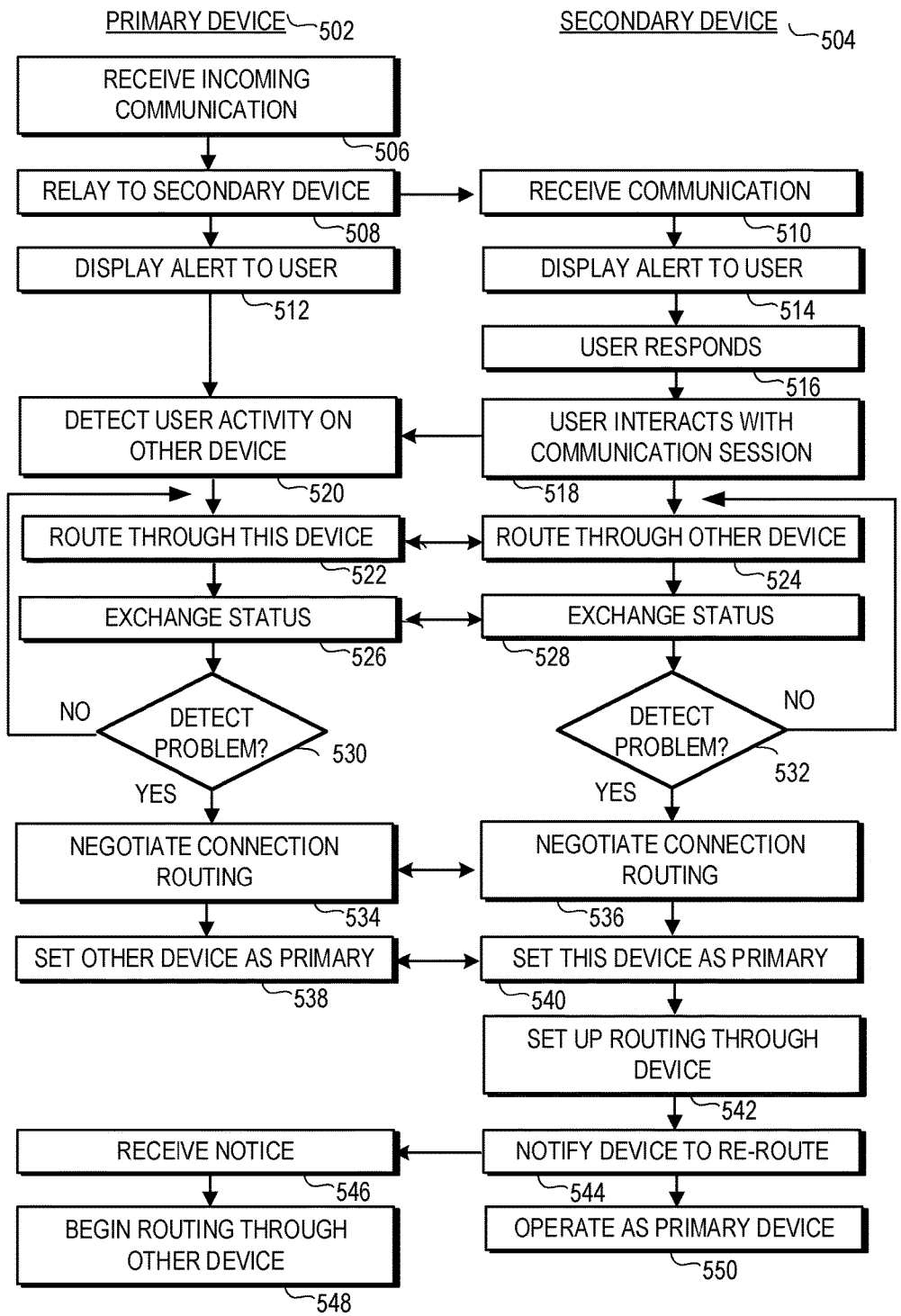
FIG. 5 is a flowchart illustration of an embodiment showing a second method for managing incoming communications.

FIG. 5 is a flowchart illustration of an embodiment 500 showing a second simplified example method for handling incoming communications, such as an incoming telephone call over a cellular connection. The operations of a primary device 502 may be shown in a left hand column, and operations of a secondary device 504 may be shown in a right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 may illustrate a process similar to embodiment 400, but where the incoming call may be answered on the secondary device. In such a case, the call may be routed through the primary device. However, if conditions warrant, the call routing may be switched to the secondary device and the roles of the two devices may be exchanged.

An incoming communication, such as a cellular telephone call, may be received by the primary device 502 in block 506. The inbound communication may be routed to the secondary device 504 in block 508, and received in block 510. Both devices may display alerts to a user in blocks 512 and 514.

In the case of embodiment 500, the user may respond in block 516 using the secondary device 504. The user may interact with the communication session in block 518.

The primary device 502 may detect that the user has interacted with the communication in block 520. The detection may be an express detection, such as where the secondary device 504 may send a message to the primary device 502 or otherwise notify the primary device 502 that the user has responded. In some cases, the detection may be an implied detection, such as where the primary device 502 may detect activity on the communications channel and assume that the user may have begun interactions.

When the primary device 502 detects that the user is interacting through the secondary device 504, the primary device 502 may stop displaying alerts to the user about the incoming communication.

As the communication occurs, both devices may gather and exchange statuses in blocks 526 and 528. While no problems have been detected in blocks 530 and 532, the process may loop. When a problem may be detected in either blocks 530 or 532, a negotiation may occur in blocks 534 and 536 to determine whether or not to re-route the communication session.

A result of the negotiation may be that the secondary device may be set as a primary device in blocks 538 and 540. The routing may be set up through the secondary device 504 in block 542, and a notice may be transmitted in block 544 and received in block 546 to begin routing the communication through the other device in block 548. Normal operation may continue in block 550 with the secondary device 504 taking the role of a primary device.

Figure 6:
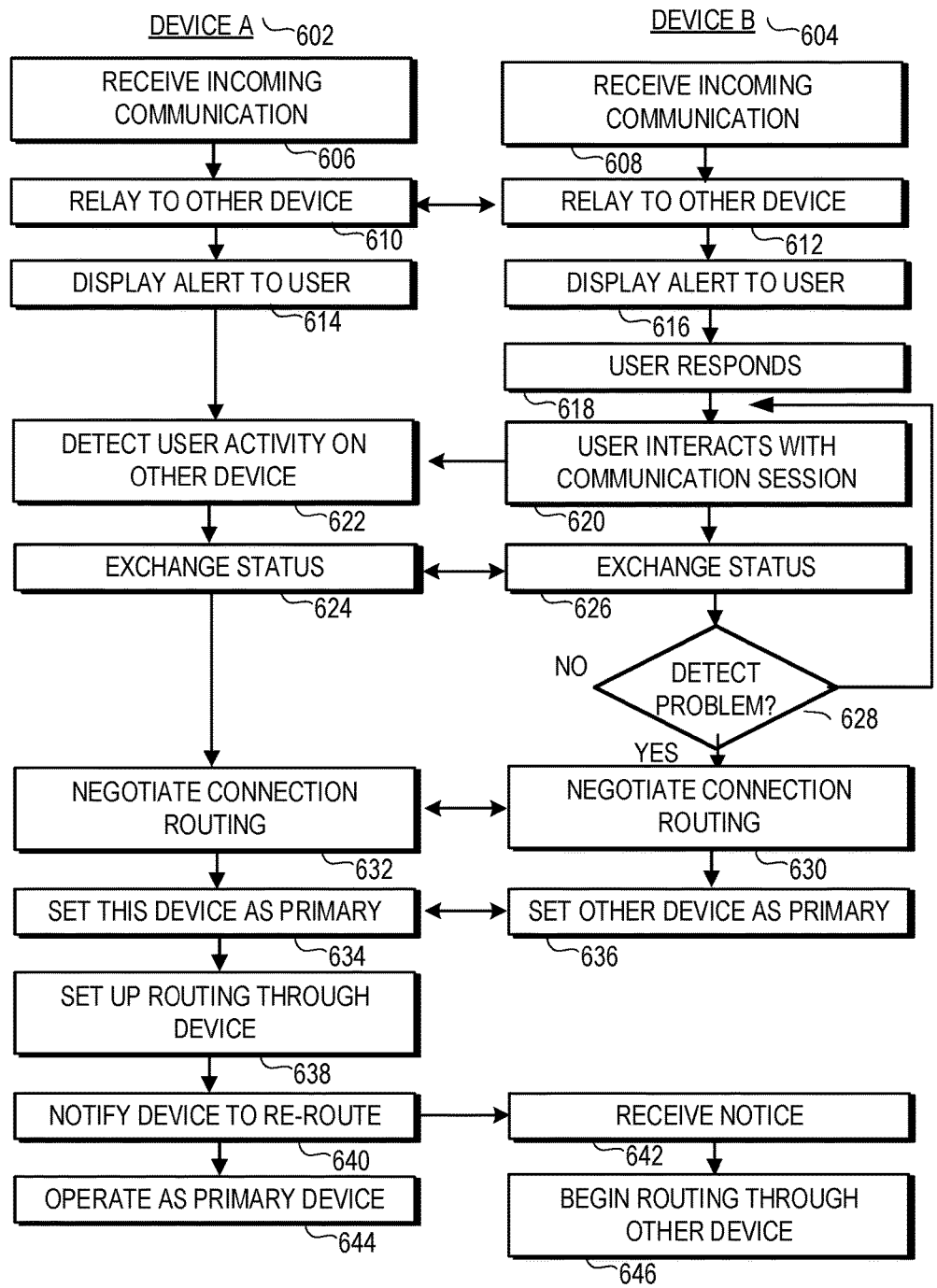
FIG. 6 is a flowchart illustration of an embodiment showing a third method for managing incoming communications.

FIG. 6 is a flowchart illustration of an embodiment 600 showing a simplified example method for handling incoming communications, such as an incoming telephone call over a cellular connection. The operations of device A 602 may be shown in a left hand column, and operations of a device B 604 may be shown in a right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 is merely one more example of how incoming communications may be handled by device A 602 and device B 604. In this example, both devices may receive the incoming communication, which may be an incoming cellular telephone call. A user may select one of the devices to answer the communication, and the other device may respond using its network connection. In effect, the responding device may operate as a primary device.

When a problem may be detected, such as a degradation in service, low battery power, or other problem, the communication may be routed through the companion device. The companion device may then be configured as a primary device.

Both device A 602 and device B 604 may receive incoming communications in blocks 606 and 608. In a typical scenario, both devices may have a cellular connection or other wireless connection, and both devices may receive the inbound call.

Because the devices may have a paired connection, both devices may inform the other device that the incoming call has been received in blocks 610 and 612. At the time of the notification, the devices may not be aware that the inbound communication may have been received by the other device.

Alerts may be displayed to the user in blocks 614 and 616, and a user may select device B 604 to respond in block 618. While the user interacts with the incoming communication in block 620, device A 602 may detect the user's activity on the other device in block 622 and may then stop alerting the user and may disconnect its connection with the incoming communication.

While normal interactions occur, both devices may exchange status in blocks 624 and 626 while no problem exists in block 628. If a problem is detected in block 628, the devices may begin negotiations in blocks 630 and 632 to determine whether to reroute the communications.

In block 636, a determination may be made that device A 602 may be made the primary device, which may be communicated in block 634. The routing through device A 602 may be set up in block 638, and the device may send a notification in block 640. The notification may be received in block 642 and routing begin through device A 602 in block 646. From that point, device A 602 may operate as a primary device in block 644.

Figure 7:
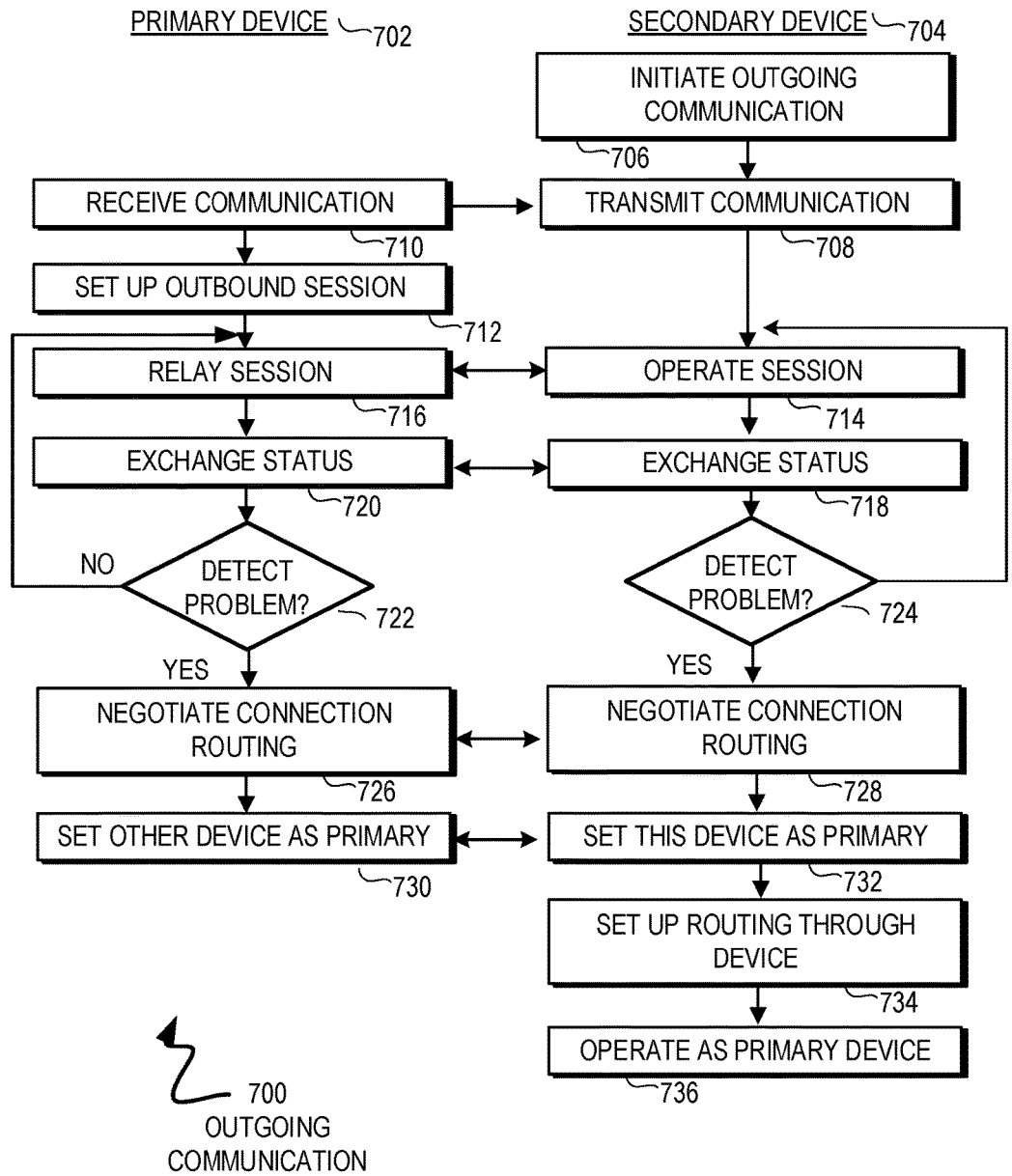
FIG. 7 is a flowchart illustration of an embodiment showing a method for managing outbound communications.

FIG. 7 is a flowchart illustration of an embodiment 700 showing a simplified example method for handling outbound communications that may originate on a secondary device. The operations of a primary device 702 may be shown in a left hand column, and operations of a secondary device 704 may be shown in a right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 700 may be one example illustration of interactions that may occur when an outbound communication may originate at a secondary device 704. The communication may be routed through a primary device 702. If problems exist with the communication, the communication session may be rerouted through the secondary device 704, and the secondary device 704 may take over as a primary device. In this example, the primary and secondary devices may be set up and configured prior to beginning the process shown in these steps.

An outbound communication may be initiated by the secondary device 702 in block 706. The communication may be transmitted in block 708 to the primary device 702, which may receive the communication in block 710. The primary device 702 may set up and outbound communication session in block 712.

The outbound session may consist of communications from the secondary device 704 being originated and received in block 714, and the primary device 702 may relay the communications upstream in block 716.

While the devices may be communicating, they may be exchanging status in blocks 718 and 720. When a problem may be detected by either device in blocks 722 or 724, a negotiation may occur in blocks 726 and 728 to determine whether or not to make changes to the communication routing.

The negotiation may determine that the devices may reverse roles, such that the secondary device 704 may become the primary device and vice versa. When such a determination may be made in block 730, the secondary device 704 may be configured as the primary device in block 732, and may set up the communications routing in block 734. The device may operate at the primary device in block 736.

Embodiment 700 may be one example where a device may begin routing outbound communications across a paired connection to another device, then may remove the other device from the communications channel when a problem may be detected.

In an example of a cellular telephone paired with a smart watch, routing communications through a cellular telephone may make sense when the smart watch may have less battery reserves than a cellular telephone. However, the two devices may become separated such that the paired connection may become noisy or may be dropped. In such a case, the smart watch may establish communications with an external network and may continue the communication.

Figure 8:
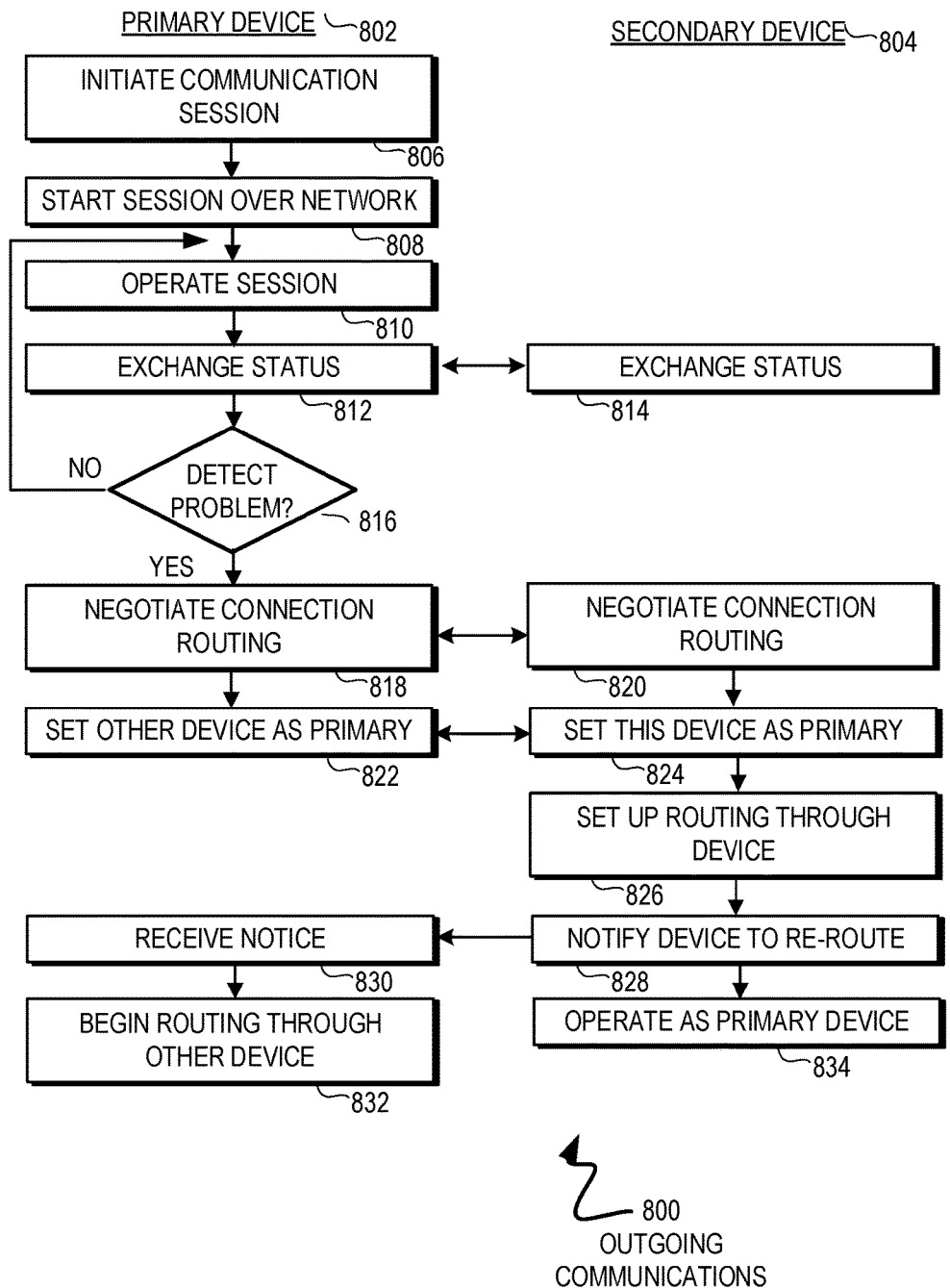
FIG. 8 is a flowchart illustration of an embodiment showing a second method for managing outbound communications.

FIG. 8 is a flowchart illustration of an embodiment 800 showing a simplified example method for handling outbound communications that may originate on a primary device. The operations of a primary device 802 may be shown in a left hand column, and operations of a secondary device 804 may be shown in a right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 800 is an example illustration of how outbound communications may be initiated on a primary device 802, and how those communications may be re-routed through a secondary device 804 when the external connection on the primary device may become problematic.

A primary device 802 may initiate a communication session in block 806, and may start a session over an external network in block 808. The session may begin normal operations in block 810.

Both devices may exchange status in blocks 812 and 814. In many embodiments, the statuses may be exchanged over a paired or authenticated communication channel. When no problems exists in the communication session in block 816, the process may loop back to block 810.

When the primary device 802 may detect a problem in block 816, the devices may begin negotiating the connection routing in blocks 818 and 820. The result of the negotiation may be to set the secondary device as the primary device in block 822, which may be received by the secondary device 804 in block 824. The secondary device 804 may set up routing in block 826 and may notify the primary device in block 828 to begin re-routing.

The primary device 802 may receive notice that the communications may be re-routed in block 830, and may begin routing the communication through the other device in block 832. The secondary device 802 may begin operating as the primary device in block 834.

Figure 9:
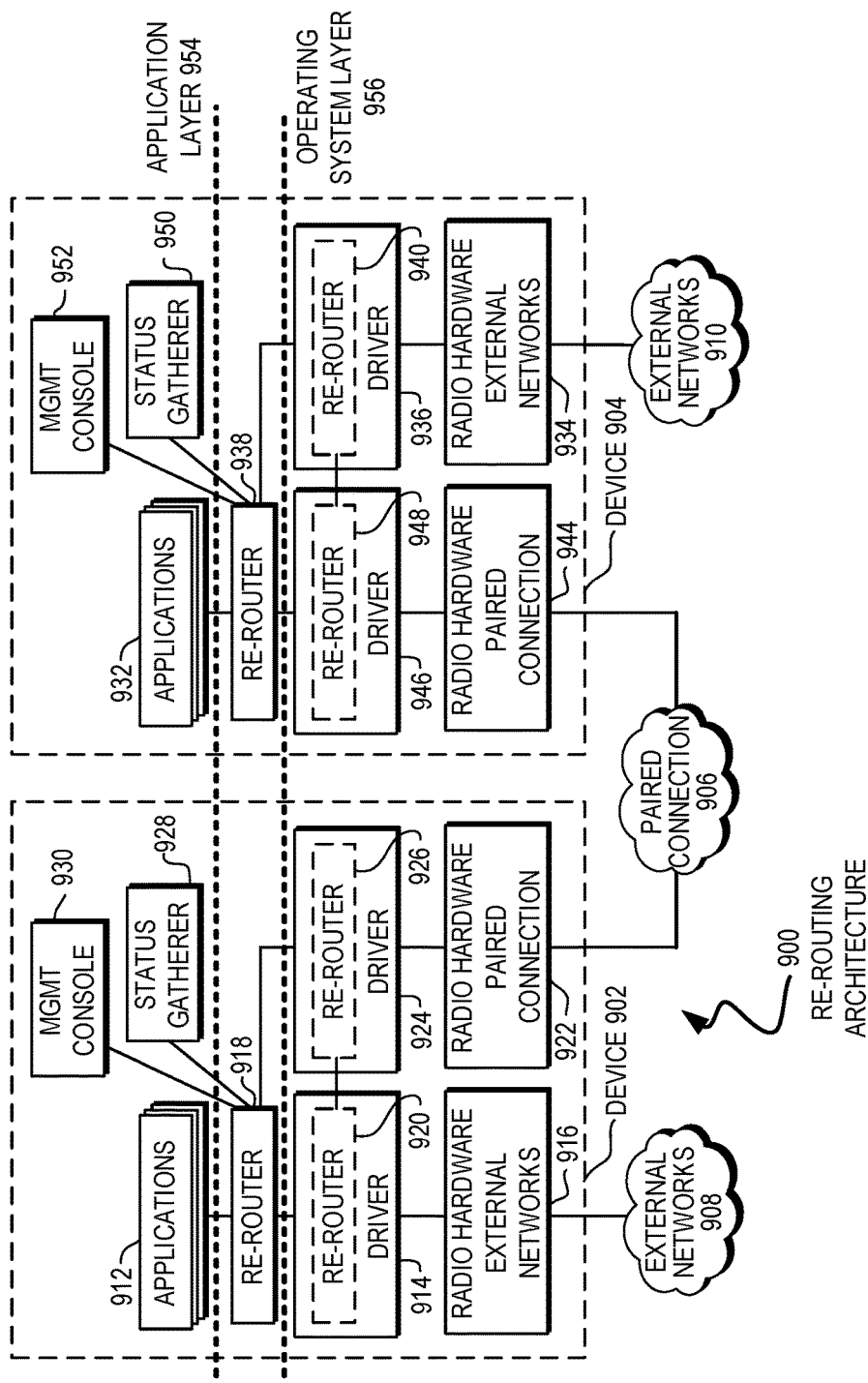
FIG. 9 is a diagram illustration of an embodiment showing an architecture for re-routing components.

FIG. 9 is a diagram illustration of an embodiment 900 showing a simplified architecture of various re-router components that may be included in a set of paired devices. Embodiment 900 may be used to show several variations of such architectures.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 900 may illustrate a software and hardware architecture that may implement various re-routing mechanisms described throughout this specification. Re-router components as described in this figure may be the mechanisms by which communications from one device may be routed through another, paired device. The re-routing components may be deployed as operating system-level or application-level components. In some cases, the re-routing technology may be implemented as drivers, while in other cases, an intermediate re-router may be in between various applications and the drivers.

In the illustration of embodiment 900, both devices 902 and 904 may be illustrated as having similar components, but some embodiments may implement various components differently. For example, a cellular telephone may have a more sophisticated operating system and application software stack, while a personal emergency device may have a much more limited software stack. In the case of a personal emergency device, the device may essentially operate a dedicated application, where the device may have customized software or hardware that may incorporate many of the re-router components as software, firmware, or hardware logic.

Devices 902 and 904 may be connected through an authenticated or paired connection 906. Device 902 may be able to connect to one or more external networks 908, and device 906 may be able to connect to one or more external networks 910.

The device 902 may have various applications 912 which may communicate with a software driver 914 to access radio hardware for external networks 916.

A re-router 918 may reside between the applications 912 and driver 914. The re-router 918 may be a software component that may intercept communications intended for the external networks 908. Once intercepted, the re-router 918 may be capable of routing the communication through radio hardware for a paired connection 922. Such a routing may re-direct the communications through a driver 926.

Such a configuration may be implemented on an existing device by adding the re-router 918 as a software change. Such a change may not affect existing drivers 914 and 924 and may be made, in some cases, without changes to an operating system. In other cases, the re-router 918 may be an operating system component that again may be deployed without changes to the drivers 914 and 924.

In general, the drivers 914 and 924 may be within the operating system layer 956. Components below the line showing the operating system layer 956 may often be considered operating system components that may have a different set of protections and access than components above the application layer 954. Some components, such as the re-router 918 may be deployed as either operating system-layer components or application-layer components.

In some cases, the re-router components may be deployed as components that may reside within the drivers. For example, the driver 914 for external networks may have a re-router 920, which may communicate with a re-router 926 that may be a feature or function within driver 926 for the paired connection. In such embodiments, the re-router functions may be deployed as changes to the drivers. Such a deployment may enable applications 912 to communicate with the various drivers without any changes to the application or the communication protocol used by the application. However, the actual communications may be re-routed to another driver without the application being aware of the re-routing.

The re-routing components may be governed by various logic, such as the problem detection logic, negotiation logic, and other components described in this specification. Such logic may receive status and other information from a status gatherer 928. A management console 930 may contain much of the logic and, in some cases, may include a user interface for managing the communications. Both the status gatherer 928 and management console 930 may be components within the application layer 954.

Device 904 may be illustrated as having the same components as device 902. A set of applications 932 may interact with external networks 934 through a driver 936. In some cases, a re-router 938 may be an intermediate component that may intercept and reroute communications to various other connections, such as through the hardware of a paired connection 944 using a driver 946.

Some implementations may have re-routers 940 and 948, which may be functions, features, or components of drivers 946 and 936, respectively. Device 904 may also have a status gatherer 950 and a management console 952, which may be part of the application layer 954.

Figure 10:
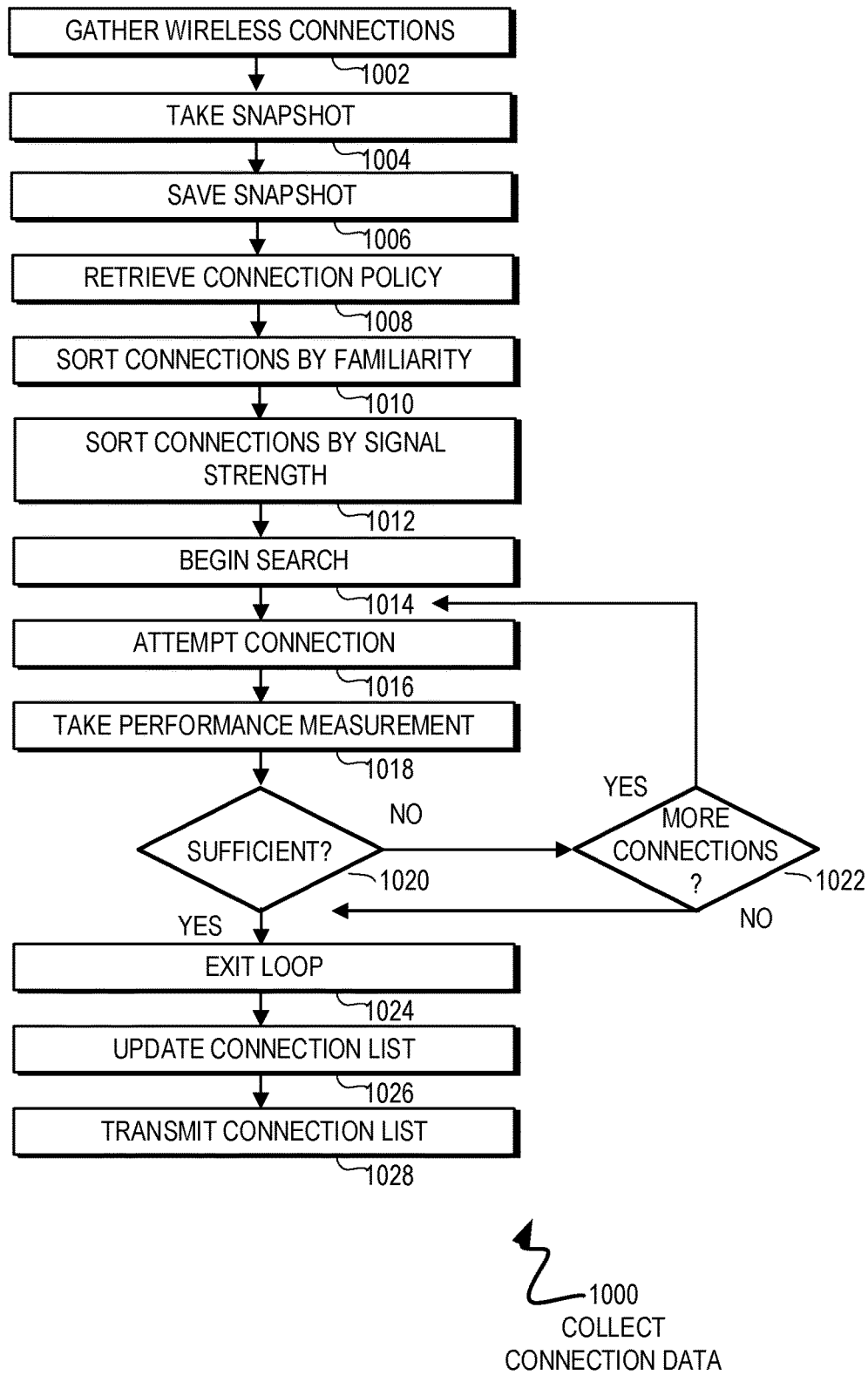
FIG. 10 is a flowchart illustration of an embodiment showing a method for collecting connection data.

FIG. 10 is a flowchart illustration of an embodiment 1000 showing a method for gathering connection data. The method may include attempting to establish connections, measuring the connection performance, and storing the connection list prior to transmitting the connection list.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1000 may illustrate one method by which connection information may be gathered. The information may be used during connection negotiation to select an appropriate connection given current connection performance. In many cases, the information gathered by the process may be transmitted to a central server for various other uses.

In one use scenario, the information gathered may be a snapshot of the electronic signals at a given point of time. In a situation such as a personal emergency alert device, the snapshot of electronic signals may gather electronic identifiers from neighboring devices and may help identify an attacker or suspicious person in the vicinity.

In another use scenario, the information gathered may be augmented by previously gathered connection information. In such a scenario, a device may retrieve connection performance data that may have been gathered from a previous analysis. These data may be used to prioritize the connections for analysis and in some cases, for determining which connection may be ultimately used. In an example, connections that may have been accessed in the past but where connection problems, cost, or other problems may have been experienced may have a lower priority, while connections that have performed well in the past may have a higher priority.

A device may identify available wireless connections in block 1002. In block 1004, various metadata about the analysis may be gathered. The metadata may include location information, such as Global Positioning System data, time data, operational information such as the processes or applications currently being executed, inputs from various sensors, such as environmental sensors, motion sensors, or other sensors, as well as other metadata. These metadata may be appended to connection data and stored for later use.

A snapshot of other devices in the vicinity of the device may be taken in block 1006. The snapshot may be saved in block 1008. In some cases, the snapshot may be saved locally, while in other cases, the snapshot may be transmitted to a remote server for storage. Some embodiments may store such information locally and may delay transmitting to a remote server until later.

A connection policy may be retrieved in block 1010. The connection policy may define which connections or types of connections may be preferred over others. In many cases, the policy may include logic, algorithms, or other mechanisms by which one connection may be selected over another. The policy may be used to rank or prioritize available connections prior to analyzing the connections prior to establishing communications across the connections.

Previous connection data may be retrieved in block 1012. The previous connection may be retrieved from local storage or may be retrieved from a remote device, such as a server. The previous connection data may be used to sort the available connections by familiarity in block 1014. The connections may be further sorted by signal strength in block 1016.

A loop may begin in block 1018 to analyze available connections. An attempt may be made in block 1020 to establish a connection with a remote device and take a performance measurement in block 1022. If the connection performance is not sufficient in block 1024 and more connections exist in block 1026, the process may loop back to block 1018 to analyze the next connection.

When a connection is sufficient in block 1024, the loop may be exited in block 1028. The snapshot may be updated in block 1030 with any performance data, metadata, or other information and may be transmitted in block 1032.

Figure 11:
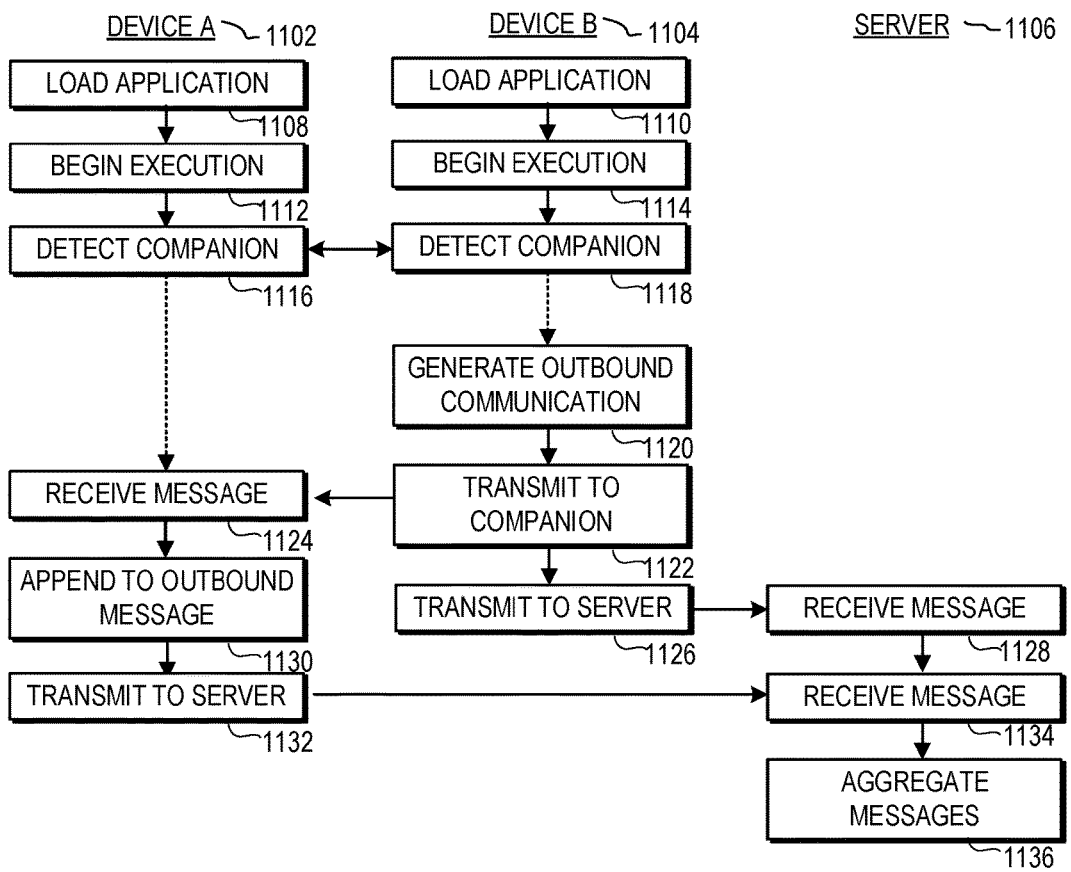
FIG. 11 is a flowchart illustration of an embodiment showing a method for outbound communications.

FIG. 11 is a flowchart illustration of an embodiment 1100 showing a simplified interaction between device A 1102, device B 1104, and a server 1106. The operations of device A 1102 may be shown in the left hand column, device B 1104 in the center column, and the server 1106 in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1100 may be an example of an application that may interact with a cooperative application on a paired device. An example scenario may be where device A 1102 may be a cellular telephone and device B 1104 may be a personal emergency device, or a device operating as a personal emergency device, such as a smart watch.

In the example, an emergency response application may reside on both devices. When an emergency signal may be generated on the personal emergency device, an outbound transmission may be made to a remote server. The signal may also be transmitted to the paired cellular telephone, and the cellular telephone may gather additional information and transmit to the remote server. The remote server may aggregate the data into an emergency alert message.

Both devices may load an application in blocks 1108 and 1110 and may begin operation in blocks 1112 and 1114. Through the paired connection, the devices may detect the companion application executing on the other device in blocks 1116 and 1118.

The device B 1104 may generate an outbound message in block 1120. The message may be transmitted to the companion application in block 1122, and may also be transmitted to the server 1106 in block 1126, where it may be received in block 1128.

The device A 1102 may receive the communication in block 1124, may gather additional information in block 1130 which may be appended to the message in block 1132. The message may be transmitted in block 1134 and received by the server 1106 in block 1136. The server may aggregate the messages in block 1138 and perform further action.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A device comprising:
   a first wireless communications channel being connectable to an external network;
   a second wireless communications channel being connectable to a second device, said second device being connectable to said external network;
   a controller capable of:
      establishing an authenticated connection with said second device through said second wireless communications channel;
      receiving a request for communications with said external network;
      determining a primary device for said external communication, said primary device being one of a group composed of said device and said second device, said primary device being identified before receiving said request for communications;
      identifying a secondary device as one of said group composed of said device and said second device, where said secondary device is not said primary device;
      causing a communication session to be established with said external network through said primary device;
      determining that said secondary device has a changed status;
      changing said secondary device to operate as said primary device; and
      changing said primary device to operate as said secondary device.

2. The device of claim 1, said request for communications originating at said external network.

3. The device of claim 2, said request for communications being received by said device and said second device.

4. The device of claim 1, said controller being further capable of:
   configuring said primary device to receive externally originated requests for communication; and
   configuring said secondary device to not receive said request for communications.

5. The device of claim 4, said secondary device being configured to not receive said request for communications by disabling a wireless communication channel to said external network.

6. The device of claim 1, said request for communications originating at said secondary device.

7. The device of claim 1, said controller further capable of:
   determining a first status from said device; and
   determining a second status from said second device.

8. The device of claim 7, said first status comprising one of a group composed of:
   battery power;
   estimated battery life;
   signal strength of an external communication channel;
   bandwidth of said external communication channel;
   signal strength of said second wireless communication channel; and
   bandwidth of said second wireless communication channel.

9. The device of claim 1, said controller further capable of:
   said request for communications originating said secondary device.

10. The device of claim 1, said controller further capable of:
    transmitting a primary device identifier to a third device, said third device being accessed through said external network.

11. The device of claim 10, said third device being capable of routing a communication from said external network to both said primary device and said secondary device.

12. The device of claim 1 being a cellular telephone.

13. The device of claim 1 being an emergency alert device, said second device being a cellular telephone.

14. The device of claim 1 being a smart watch, said second device being a cellular telephone.

15. A method performed by a computer processor on a device, said device having a first wireless communications channel being connectable to an external network and a second wireless communications channel being connectable to a second device, said second device being connectable to said external network, said method comprising:
- establishing an authenticated connection with said second device through said second wireless communications channel;
- receive a request for communications with said external network;
- determining a primary device for said external communication, said primary device being one of a group composed of said device and said second device, said primary device being identified before receiving said request for communications;
- identifying a secondary device as one of said group composed of said device and said second device, where said secondary device is not said primary device; and
- causing a communication session to be established with said external network through said primary device;
- determining that said secondary device has a changed status;
- changing said secondary device to operate as said primary device; and
- changing said primary device to operate as said secondary device.

16. The method of claim 15, said request for communications originating at said external network.

17. The method of claim 16, said request for communications being received by said device and said second device.

18. The method of claim 17 further comprising:
- configuring said primary device to receive externally originated requests for communication; and
- configuring said secondary device to not receive said request for communications.

19. The method of claim 18 further comprising:
- causing said secondary device to be configured to not receive said request for communications by disabling a wireless communication channel to said external network.

20. The method of claim 15, said request for communications originating at said secondary device.

21. The method of claim 15 further comprising:
- determining a first status from said device; and
- determining a second status from said second device.

22. The method of claim 21, said first status comprising one of a group composed of:
- battery power;
- estimated battery life;
- signal strength of an external communication channel;
- bandwidth of said external communication channel;
- signal strength of said second wireless communication channel; and
- bandwidth of said second wireless communication channel.

23. The method claim 15, said request for communications originating said secondary device.

24. The method of claim 15 further comprising:
- transmitting a primary device identifier to a third device, said third device being accessed through said external network.

25. The method of claim 24, said third device being capable of routing a communication from said external network to both said primary device and said secondary device.

26. The method of claim 15, said device being a cellular telephone.

27. The method of claim 15, said device being an emergency alert device, said second device being a cellular telephone.

28. The method of claim 15 being a smart watch, said second device being a cellular telephone.

* * * * *